3,751,474
METHOD OF PREPARING NONTOXIC
POLYAMINES
Kenneth G. Phillips, River Forest, and Marcellus J. Geerts, Mount Prospect, Ill., assignors to Nalco Chemical Company, Chicago, Ill.
No Drawing. Filed Jan. 28, 1971, Ser. No. 110,612
Int. Cl. C07c 85/04, 87/20
U.S. Cl. 260—583 P                                2 Claims

ABSTRACT OF THE DISCLOSURE

A method of preparing novel polyethylene polyamines from the reaction of ammonia and ethylene dichloride is shown. The products have a high molecular weight and are preparing using a mole ratio of ammonia to ethylene dichloride of more than 2.6:1. The polyamines are substantially nontoxic to fish in contrast to standard polyamines.

INTRODUCTION

Prior art methods of preparing polyethylene polyamines via reaction of a lower amine and an ethylene dihalide have certain drawbacks. Most importantly, when one follows known synthetic techniques involving a reaction of this type, only products of relatively low average molecular weights are achieved. For example, reaction of ammonia and ethylene dichloride via known procedures results in a mixture of polyethylene polyamines in which there is present a substantial proportion of lower polyethylene polyamines such as ethylene diamine, diethylene triamine, etc. Adjustment of certain process variables such as molar ratio, pressure, temperature, etc., does not overcome the inherent deficiencies of the reaction in only polymerizing to a certain minimal degree. The same situation is noted with respect to reaction of lower polyamines and ethylene dihalides. A large percentage of the mixture of polyethylene polyamine products are composed of only 2 or 3 mer. units.

For example, Mnookin U.S. Pat. 2,049,467 teaches a process for producing polyamines using either a batch or a continuous process. But polyamines of higher molecular weight usually make up only 10% of the product. Therefore, if higher molecular weight amines are desired in substantial quantity, this process is not applicable. For instance, if polyamines having a greater molecular weight than pentamines, which have a molecular weight less than 200, are desired, this process could not be used.

Another drawback with respect to prior art production of some polyethylene polyamines is difficulty of separating out unwanted salt by-product from the desirable organic polyamine phase. If, for example, a reaction between ammonia and an ethylene dihalide such as ethylene dichloride is run in water, both organic product and ammonium chloride salt remain dissolved in water and are difficult to separate out one from the other without resort to sophisticated, costly and time-consuming separation techniques. Yet, in many instances such separation is essential, since only the organic polyamine in a relatively pure state is the desired material, and a substantial degree of residual inorganic salt concentration cannot be tolerated.

In many instances, it is extremely desirable that a synthesized polyethylene polyamine have a relatively high molecular weight. This is due to the fact that often effectiveness of the resultant end use of the polyethylene polyamine depends, at least in part, upon its molecular weight. For example, it is generally felt that efficiency of coagulation by employment of polyethylene polyamine compounds is directly proportional to their extent of polymerization expressed in terms of molecular weight. The higher molecular weight materials then generally show greater activity as coagulants. Also, a relatively pure product is desired, that is, one having a low inorganic salt content, since generally only the polyamine organic is useful in promoting coagulation. A salt by-product such as ammonium chloride has substantially less coagulant activity than the polyamine.

Some of the drawbacks of the prior art have been overcome by a semi-batch process disclosed in a copending application entitled Method of Preparing Polyamines and Products Thereof, Ser. No. 11,358, filed Feb. 13, 1970. The cited application discloses a method of preparing high molecular polyamines. But one of the remaining disadvantages is that these polyamines, as well as prior polyamines, are very toxic to fish. Since polyamines are useful for coagulation, water treatment, and similar uses, there was a need to develop a nontoxic polyamine.

OBJECTS

It would be of benefit to the art if a method were devised of synthesizing polyethylene polyamines of a high molecular weight. If as an added benefit inorganic salt by-products, produced by reaction of ammonia and ethylene dichloride could be simply separated from the useful organic portion, the process would be an extremely attractive one, finding ready acceptance in the art. It therefore becomes an object of the invention to provide a method of producing relatively high molecular weight polyethylene polyamines.

Another object of the invention is to provide a process of producing such polyethylene polyamines through a simple, easily follwed technique, using ammonia and ethylene dichloride.

Yet another object of the invention is to provide polyethylene polyamine products made from ammonia and ethylene dichloride which are substantially nontoxic to fish and yet useful for promoting coagulation of suspended particles.

A specific object of the invention is to provide a method of reacting ammonia and ethylene dichloride whereby the ammonium chloride salt by-product is easily separable from the desired organic polyethylene polyamine of relatively high molecular weight range.

Another object is to provide a process of producing polyethylene polyamines using one of the reactants, namely the ethylene dichloride to control the reaction. It is an object to provide a process of producing polyethylene polyamines using a minimum amount of water.

Other objects will appear hereinafter.

INVENTION (A) Method of manufacture

In accordance with the invention, a method of producing nontoxic polyethylene polyamines has been discovered. In its broadest aspect, the proces includes the steps of reacting in at least sufficient water to completely solubilize the formed organic product, ethylene dichloride and ammonia. Ammonia is used due to its excellent reactivity, low cost and availability. The other reactant is ethylene dichloride.

The reaction itself should be carried out under carefully controlled conditions. The temperature of the reaction ranges from about 135° to about 400° F., but preferably ranges from 200 to 250° F., and even more preferably from 212° to 235° F. The polymerization is effected under a pressure of 75 to 1000 p.s.i. The reaction itself is accomplished by slowly introducing to a fixed amount of ammonia in a reaction zone ethylene dichloride at a rate sufficient to maintain a fixed predetermined temperature within the aforementioned limits. The rate of addition of ethylene dichloride ranges from 0.45 to 0.87 gram/hour/gram ammonia. Therefore, by carefully controlling the introduction of the reactant, the temperature can be maintained at a fixed predetermined limit. Sufficient water should be initially introduced into the reaction zone so that the formed organic product is solubilized therein both at any point during the polymerization and subsequently upon completion of the run. The initial ammonia concentration in the water heel ranges from 20 to 30% by weight. The final polyamine content in the system can vary but usually falls within the range of from 10 to 30% by weight of the final reaction product. A preferred range is from about 28 to 30% by weight of polyamine.

The molar ratio of ammonia to ethylene dichloride should be kept above 2.6:1. Preferably, the ratio should range from 3.0:1 to 2.6:1.

If the above reaction conditions are followed, polyethylene polyamine products of relatively high molecular weight are achieved. For example, reaction of ammonia and ethylene dichloride according to the above directions yields mixed polyethylene polyamines having an average molecular weight in excess of 300 and usually in excess of 500. Polyethylene polyamine products having a molecular weight even as high as 5000 may be achieved.

The polymerization reaction is more preferably carried out at temperatures from about 212° to 235° F. and under pressures ranging from about 75 p.s.i. to about 200 p.s.i. In such cases, the products have better clarity, and less color than do those formed under more stringent reaction conditions.

The above-described reaction is one of an exothermic nature. Therefore, in order to more closely control the reaction and allow a higher addition rate of ethylene dichloride, it may be necessary to apply a source of external cooling to the reaction zone such as by merely encasing such zone with a cooling jacket of water. In any case, whether external cooling is applied or not, the flow of ethylene dichloride is adjusted so as to maintain the temperature substantially at any point chosen from within the above-mentioned range.

After the reactor volume has been substantially filled with reaction product, the ethylene dichloride flow is ceased. The residual, unreacted ethylene dichloride is consumed by further reaction with the ammonia reactant, preferably at the same temperature and pressure as previously employed in the run.

In a preferred embodiment of the invention, the reaction is allowed to continue for from 5 to 60 minutes to complete the reaction. This allows the substantially complete formation of polyamines which are substantially nontoxic to fish.

When the ammonia has been reacted with an ethylene dichloride, ammonium chloride by-product is produced. Surprisingly enough, by closely following the above directions, this by-product is salted out from the aqueous reaction product solution at room temperature. Thus, a simple separation of ammonium chloride from organic is possible by merely subjecting the reaction product to centrifugation techniques or filtration. It is greatly preferred that the ammonium chloride be centrifuged off from the organic polyamine which remains in aqueous solution.

The relatively high molecular weight polyamine product itself, at the termination of the reaction, is generally in a polyethylene polyamine hydrochloride form. "If the free base is desired, neutralization may be effected by addition of some strong base such as calcium hydroxide, sodium hydroxide, potassium hydroxide, etc. Again the salt formed from the neturalization may be easily separated from the organic free base." By the term "polyethylene polyamine" it is understood then to mean both the free base, or ammonium salt form or mixtures of the two.

(B) Products of the invention

In the reaction system taught by this invention, the ethylene dichloride reactant is added to a reactor at a relatively slow rate.

The carbon to nitrogen ratios characteristic of the products taught by this invention are at least 2.5:1. Preferably, these ratios should be between 2.7:1 and 3.0:1.

Simple polyamines of the type ethylenediamine, diethylenetriamine, and tetraethylenepentamine, all require the order of 400 to 500 p.p.m. for satisfactory coagulation of 20% SBR latex suspension. Commercially available products which are mainly by-products for making the aforesaid polyamine require in the order of 300 p.p.m. to effect satisfactory coagulation. This is to be compared with the polyethylene polyamines product taught by this invention which requires slightly under 200 p.p.m. for effective coagulation.

In review of the prior art a reaction system similar or equivalent to that taught by this invention relating to the production of polyethylene polyamines could not be found.

It is believed that quaternary species are the probable cause of fish toxicity. Piperazine derivatives and linear polyamines are relatively nontoxic to fish. The following table shows fish toxicity of various compounds.

TABLE I

Fish Toxicities

| Chemical | $LD_{50}$ Fish Kill |
|---|---|
| Poly quaternary of N-methyl aziridine, p.p.m. | 1.5–3 |
| Polyamine N–7 [1], p.p.m. | 2–8 |
| Poly ethylenimine, p.p.m. | 1 |
| N-2-amino ethyl piperazine | 460 |
| Dimethyl-chloroethyl amine | 120 |
| N-2-hydroxyethyl piperazine | >1000 |
| N,N'-bis-3-aminopropyl piperazine | >1000 |

[1] This polyamine was prepared using a molar ratio of ammonia to ethylene dichloride of less than 2.6 : 1.

As can be readily seen the piperazine derivative are much less toxic than quaternary compounds.

It is preferred that water be introduced into the reaction from the beginning of the run. If an aqueous solution of ammonia is employed, the solution itself is introduced into the reaction zone initially. However, water may be introduced from an independent source other than as a solvent medium for the reactant. For example, the reaction may be carried out whereby water is charged to the reactor, and anhydrous ammonium from an outside tank source is introduced into the reaction zone.

It has been determined that generally at least about 70% of the final total reaction product weight should be composed of water. As previously stated, the water ranges from about 70% to about 90% by weight of the final reaction product. The preferred range of water is from about 70% to about 72% by weight. In a run involving ammonia and ethylene dichloride, wherein water constituted about this latter weight figure based on final reaction product weight, substantially all the ammonium chloride salt is easily centrifuged from the organic polyethylene polyamine phase which remains preferentially solubilized in the water.

The reaction itself may be carried out over a wide range of times. Of course, such variable is related directly to the size of the batch prepared as well as temperature and pressure variables. Generally, however, the reaction takes from about ½ hour to about 20 hours and most often is completed in 1 to 12 hours time. Also, if one follows the above-outlined procedure with respect to reactant feed rates, it has been determined that approximately 1 to 4 moles of ammonia are used up in reaction with one mole of ethylene dichloride over the course of the entire run, and more generally 2 to 3 moles of ammonia per mole of ethylene dichloride are expended.

The mole ratio of ammonia to ethylene dichloride should be kept above 2.6:1. Preferably, the ratio should range from 2.6:1 to 3.0:1.

EXAMPLES

The following examples illustrate the practices of the invention. It is understood, of course, that these examples are merely illustrative and that the invention is not to be limited thereto.

Example I

A one gallon glassed steel reactor is set up to which is attached external sources of both anhydrous gaseous ammonia and ethylene dichloride. The reactor was first charged with 694.6 grams of water. This was a sufficient volume to allow good agitation with the equipment employed. The reactor was heated until the temperature reached 212° F. and the system then pressurized with the anhydrous ammonia to 100 p.s.i. The system was then vented to remove air, repressurized to 100 p.s.i. with ammonia and heated to 212° F. The above pressure was maintained at this 100 p.s.i. level and 219.4 grams of ammonia were added.

Ethylene dichloride was then pumped into the reactor and water cooling turned on. During the reaction, the temperature of the reaction was maintained at 212° F. by adjusting the amount of ethylene dichloride introduced. By such careful manipulation of rate of ethylene dichloride added to the system, the temperature of the exothermic reaction could be maintained constant at the 212° F. level. It took approximately 3½ hours to feed the total amount of ethylene dichloride reactant. The rate of addition of ethylene dichloride was about 1.91 cc./min.

After the reactor had approached its capacity charge, the pumping of ethylene dichloride into the reaction zone was discontinued. The reaction was further heated for 1½ hours to react residual ethylene dichloride. The system was then cooled and vented. The polyamine product was then subjected to centrifugation and the ammonium chloride by-product separated out from the aqueous solution of polymeric amine. After the centrifuging step, the polyamine contained only about 1 to 2% ammonium chloride. Separation therefrom of the unwanted salt from aqueous polyamine solution was excellent.

Details of many different runs are shown in Table II below:

tially filled. After the addition is complete, the reaction continues for from 5 to 60 minutes to allow for complete reaction. This allows high molecular weight products to be achieved. This is not a true continuous process because the reaction product is not withdrawn until the entire reaction has been completed. This is not a true batch process because one of the reactants is being continuously added to the reactor.

In order to compare different process systems, the following tests were run.

Batch process: One mole of ethylene chloride was placed in a reactor with 2.5 moles of ammonia. This reaction system was heated to 100° C. and allowed to react for 30 minutes. This product is referred to as B-1.

Continuous process: One mole of ethylene dichloride was reacted with 2.5 moles of ammonia by simultaneously being fed through uniform diameter tubing. The residence time (total time for the reactants to pass through the tubing) was 2 to 3 minutes. The reaction temperature was 140° C. This product is referred to as C-1.

Semi-batch process (this process produces products similar to subject matter of this invention): One mole of ethylene dichloride was reacted with 2.5 moles of ammonia. The reaction was carried out by adding the ammonia to the ethylene dichloride during the course of the reaction. The reaction was carried out in two hours at a temperature of 100° C. This product is referred to as S-1.

The following table summarizes the characteristics of the three products.

TABLE III

| Characteristics | B-1 | C-1 | S-1 |
|---|---|---|---|
| Atom ratio of carbon to nitrogen | 2.05:1 | 2.05:1 | 2.7:1 |
| Molecular weight | <1,000 | <1,000 | >1,000 |
| Percent by weight of product which has boiling point greater than tetra ethylene pentamine | | | |

As can readily be seen from the table, higher molecular weight products are obtained than by prior art methods. The product produced by the semi-batch process contained no lower polyamines such as pentamine, diamine, etc.

The products derived from the just-described process of the invention are extremely useful as coagulants. To effect TABLE II
Laboratory D-2237 preparations

| | Reactants | | | | | | Reaction conditions | | | | | Reaction product | |
|---|---|---|---|---|---|---|---|---|---|---|---|---|---|
| | Aqueous NH₃ charge | | EDC addition | | | NH₃/EDC mole ratio | | | Initial press. (p.s.i.g.) | Final press. (p.s.i.g.) | Reaction time (minutes) | | Percent of charge reacting | Percent polyamine |
| Run No. | Grams | Percent NH₃ | Grams | Rate (cc./min.) | Charged | Reacting | Temp. (° F.) | | | EDC addition | Total | | |
| 2 | 914.0 | 24.0 | 471.5 | 1.91 | 2.70 | 2.75 | 212 | 78 | 23 | 197 | 280 | 96.7 | 14.1 |
| 3 | 886.0 | 24.3 | 483.0 | 1.76 | 2.60 | 2.93 | 212 | 82 | 15 | 219 | 363 | 90.8 | 14.3 |
| 4 | 901.6 | 24.3 | 510.0 | 1.67 | 2.50 | 2.91 | 212 | 80 | 35 | 244 | 331 | 95.8 | 14.9 |
| 5 | 870.9 | 24.4 | 414.0 | 1.75 | 2.98 | 3.07 | 212 | 84 | 31 | 188 | 295 | 85.3 | ᵇ14.4 |
| 6 | 874.5 | 24.2 | 440.0 | 1.74 | 2.80 | 2.94 | 212 | 75 | 27 | 201 | 303 | 92.4 | 14.3 |
| 7 | 858.0 | 21.2 | 425.0 | 1.77 | 2.49 | 2.80 | 212 | 65 | 38 | 192 | 312 | 100.5 | |
| 8 | 876.7 | 24.3 | 409.7 | 1.75 | 3.03 | 3.03 | 325 | 112 | 40 | 187 | 280 | 92.5 | 16.0 |
| 9 | 888.0 | 29.7 | 529.0 | 2.29 | 2.90 | 3.08 | 212 | 110 | 49 | 184 | 274 | 90.6 | |
| 1 | 898.2 | 25.3 | 330.8 | 1.96 | 4.00 | 4.00 | 212 | 90 | 43 | 135 | 228 | 94.8 | 12.3 |
| 10 | 872.5 | 25.2 | 441.5 | 2.55 | 2.89 | 3.18 | 212 | 80 | 35 | 138 | 300 | 100.0 | 13.8 |
| 11 | 738.5 | 23.8 | 354.0 | 1.05 | 2.90 | 3.14 | 212 | 79 | 34 | 268 | 332 | 99.4 | 17.3 |
| 12 | 839.0 | 21.4 | 373.0 | 1.52 | 2.80 | 3.11 | 212 | 66 | 27 | 196 | 288 | 96.4 | 13.9 |
| 13 | 635.5 | 23.9 | 403.0 | 1.28 | 2.19 | 2.32 | 212 | 80 | 47 | ᵃ251 | 344 | 95.1 | 13.7 |

ᵃ For last 120 minutes of EDC addition (4.07 mole total added), 4.07 mole NaOH (as 50% aqueous NaOH) was added simultaneously.
ᵇ Estimated.

Molecular weight determinations were made on the above polyamine product. The molecular weight was in excess of 100 and usually about 300 to 500.

Other runs involving amines other than ammonia such as ethylene diamine and diethylene triamine may also be reacted with ethylene dichloride or other ethylene dihalides to give the products having a substantially higher molecular weight than heretofore achievable.

This process is actually a semi-batch process. The ethylene dichloride reactant is continually added to a fixed amount of ammonia until the reactor volume is substancoagulation, all that is necessary is to add the products of the invention to the liquid containing suspended solids which are to be removed from the liquid phase. The suspended solids so agglomerated by action of the polyethylene polyamine are then merely separated from the suspending liquid by, for example, allowing them to settle out by gravity force.

The polyethylene polyamines of the invention may be used to coagulate or flocculate suspended solids from a number of liquid solutions or slurries. For example, the polymers may be used to accelerate separation of suspended solids from the suspending liquid phase in the following systems: turbid water, hard water, uranium ore slurries, copper ore slurries, potash slurries, aluminum hydroxide slurries, iron oxide slurries, tin slurries, borax slurries, dyestuff waste, glass polishing waste, sewage waste waters, carbon slurries, magnesia slurries, silica slurries, impure sugar solutions, brine solutions, caustic solutions, and kaolin slurries.

The above aqueous liquids are well-known liquid solutions or slurries which need little elaboration. However, in a few instances some further discussion is needed. Specifically, by the term "turbid water" is meant an aqueous liquid containing less than 0.1% suspended solids. These solids are predominantly inorganic in nature and may be present in impure aqueous liquids in amounts ranging as low as 0.0015% by weight of the suspension. Also, by the term "hard water" is meant water containing hardness constituents and usually calcium and magnesium ions. These waters are best defined in terms of alkaline earth metal content. Generally, these hard waters contain at least 100 p.p.m. of alkaline earth metals, expressed as calcium carbonate, and may contain as high as 1500 p.p.m. Usually, the coagulant is used in conjunction with a lime soda softening process. In such a process, water containing hardness components such as calcium and magnesium are treated with lime or lime soda to form insoluble calcium and magnesium carbonates or hydroxides which are then settled out by means of coagulants and subsequently separated. Also, by the term "impure sugar solutions" is meant aqueous solutions containing dissolved sugars and water-insoluble suspended impurities. By the use of the phrase "coal slurries" is meant to include aqueous liquids containing suspended coal particles as well as aqueous liquids containing coal and other suspended matter such as clay, silica, etc., as may be found in water resulting from the washing of coal. "Sewage waste water" includes both municipal & domestic wastes as well as industrial waste waters. Lastly, by the phrase "brine solutions" is meant sodium & calcium chlorine salt solutions and mixtures thereof which additionally contain suspended impurities.

With more specific regard to the systems listed above and others, it has been determined that the polymers of the invention are effective in coagulating and producing setting of finely-divided solids, especially those which are predominantly inorganic and normally remain suspended in water. For example, the polyethylene polyamines are effective in treating dilute solutions of water containing concentrations of predominantly inorganic solids within the range of about 0.0015% to about 3% by weight of the suspension. Again, the polymers may be used to clarify industrial waste which would otherwise create a nuisance and cause pollution of lands and streams. Such waste comprising aqueous suspensions of undesirable materials include phosphate mine waters, coal washing waters, clay suspensions, calcium carbonate suspensions, and other suspensions of finely divided solids and water which result from industrial processes such as mining, washing, purification and the like. The suspensions will remain stable for days, months and oftentimes even for years without proper treatment and many of them are not affected by the addition of ordinary coagulants such as alum.

In addition to treatment of industrial waste waters it has been found that the polymers of the invention may be used to coagulate water obtained from natural sources to render them suitable for many applications. For example, rivers, streams and lakes which often contain suspended solids such as silt, clays and minor amounts of organic color bodies which are undesirable and often difficult to remove by using inorganic coagulating chemicals, may be clarified using only minor amounts of the organic polymers of the invention. The organic polyethylene polyamine compositions are superior to use of inorganic coagulants such as alum, sodium aluminate and lime even when the latter are employed in relatively large amounts. These prior art materials had disadvantages in that excessive amounts had to be used over long periods of settling time before proper clarification was achieved.

In addition to the above, it was discovered that the polymers of the invention could be used to clarify brine and brackish waters used in the recovery of petroleum by secondary water-flooding operations. Efficiency in these systems is dependent on use of waters free from objectionable suspended impurities since such impurities tend to plug the underground formations into which said waters are placed. The polyethylene polyamines of the invention coagulate even these difficultly clarified brackish waters. The coagulants of the invention also find use in a variety of naturally-occurring waters used in such industrial operations a paper-making, petroleum refining, hydroelectric plants, atomic energy operations, metal plating, boiler plants, and the like.

Lastly, the copolymers of the invention find use in the improvement of floc size and settling in hot phosphate softening processes. In such processes, waters containing hardness components such as calcium and magnesium phosphate salts which settle out and are separated. Orthophosphates, such as anhydrous disodium phosphate are employed for this purpose. In this type of process, the precipitated inorganic solids are very finely divided with the result that coagulation and settling are relatively slow and it is difficult to produce a water free from turbidity. Hot phosphate softening frequently used as a primary softening for low hardness waters. It is also often used as a secondary softening following lime soda softening of high hardness waters. This latter softening process includes those processes in which lime is employed either alone or in conjunction with minor amounts of soda ash or alkaline materials such as sodium aluminate for the treatment of waters with separation of hardness components by precipitation. In the hot softening processes, temperatures of 180° F. to 275° F. (under pressure) are frequently employed, the preferred temperatures being within the range of 212° F. to 240° F. In the above type processes, the organic polymeric compositions are particularly helpful in improving floc size and settling of the precipitated inorganic solids.

As mentioned above, coagulation of the above type suspended solids is achieved by merely adding and mixing the aqueous polymeric solutions with the liquid suspensions. The coagulated solids are then separated from the suspending medium in most cases by permitting the coagulated solids to settle out. There are times, however, when the separation is effected by filtering or other processing steps. The expression "separating out the coagulated solids from the suspending liquid" as employed herein is meant to include and cover separation by settling as well as separation by actually recovering the coagulated solids from water or other suspending liquid, as by filtering, and separation by removing the liquid from the coagulated solids as by decanting or allowing the supernatant water to overflow.

As previously indicated, the polymers of the invention are especially useful in coagulating and producing settling of finely divided solids which are predominantly inorganic and are present in concentrations of 15 p.p.m. to 30,000 p.p.m. by weight of the total suspension in water. These suspensions are normally considered to be low turbidity water suspensions as opposed to heavy slurries, the latter containing solid contents between about 7 and 70% by weight of the total suspension. When it is desired to employ the polymers to produce coagulation and settling of low turbidity water suspensions, it is usually desirable to treat these suspensions with about 0.1 to 30 parts of active polymer per million parts of suspension being treated. This amount, of course, may vary according to the degree of difficulty of coagulation of the particular suspension. Also, when coagulating heavy slurry suspensions, for example it may be necessary to considerably more polymer to achieve the desired result. In many instances, it is necessary to use coagulant dosages as high as 1000 p.p.m.

Thus, the dosage levels to achieve good coagulation activity may range as little as 0.1 p.p.m. of polyethylene polyamine product based on active organic polyethylene polyamine solids present. More preferably, the dosage ranges from about 1 to about 1000 p.p.m. with the most preferred range being 1–100 p.p.m.

The polyethylene polyamines of the invention have been found to be particularly useful in coagulating rubber latexes, both natural and synthetic. Among the synthetic latex systems, the polyamine materials have found particular use in coagulating the following rubber latex suspensions; copolymer of styrene, and butadiene, polybutadiene, polyisoprene, copolymer of isobutylene and butadiene, copolymer of butadiene and acrylonitrile, polysulfides, polyesters, polyacrylic, vinylidene chloride copolymer, chlorinated polyethylene, butadiene-vinylpyridine copolymer, polyesterdiisocyanate polymer, silicones rubbers, etc. It is also thought that the properties of the solid coagulated rubber compositions are improved in a number of ways by treatment of the aqueous rubber latex with the polyethylene polyamine product.

Other polymeric latexes which are coagulated by admixture with a polyethylene polyamine disclosed herein include polymers of one or more monovinylidene monomers such as acrylonitrile, methacrylonitrile, alkyl acrylates and methacrylates (e.g. methyl acrylate, ethyl acrylate, butyl acrylate, 2-ethylhexyl acrylate, corresponding methacrylates, etc.), monovinylidene aromatic monomers (e.g. styrene, alpha-methyl styrene, and other ar-alkyl styrenes, p-chloro- and other ar-halo styrenes, vinyl naphthalene, etc.); and mixtures of such polymers.

These polymeric and rubber latexes generally contain emulsifying agents, e.g. fatty acid acid soaps, which keep the polymer particles dispersed in the aqueous medium until the latex and coagulant are mixed, and they frequently contain optional additives, such as antioxidants, heat and light stabilizers, pigments, etc.

The polyethylene polyamine products formed by the techniques of the instant invention have been found to be equal in activity to polyethylene polyamine products formed by the semi-batch process previously described. The main advantage of the instant process is that the polyethylene polyamine products are substantially nontoxic to fish.

Polyethylene polyamine products formed by the semi-batch process were compared to polyamine products synthesized by prior art techniques.

than as taught here and the reaction caused to proceed even under high pressures and temperatures, the polyethylene polyamine products did not approach the molecular weight levels or coagulant activities of those products synthesized by the instant method.

Excellent activity is noted when a latex suspension comprising a copolymer of styrene and butadiene suspended in water is treated with the polyethylene polyamine products of this invention. Clear, aqueous supernatant liquids were achieved and the flocs of copolymer were rapidly formed which further coalesced into an easily removable solid mass.

The polyethylene polyamine of Example I was also tested for activity in clarifying a turbid water. Specifically, 350 ml. of a synthetic low turbidity water containing 200 p.p.m. kaolin clay in aqueous suspension was treated with 0.3 p.p.m. of active polyethylene polyamine and compared to a blank run, that is, one tested without benefit of chemical. The chemical treatment was added to the kaolin clay suspension, the treated suspension stirred at 100 r.p.m. for 5 minutes, 50 r.p.m. for 10 minutes and then allowed to settle for 15 minutes. The supernatant was collected and residual turbidity measured in terms of p.p.m. $SiO_2$—the turbidity being measured on a turbidometer. The turbidity of the supernatant clarified with benefit of polyethylene polyamine was approximately 15 p.p.m. The blank had a turbidity in excess of 200 p.p.m. Thus, it can be seen that even with only minute amounts of the polymer of the invention exceptional results in terms of coagulation efficiency are realized.

In yet another test, the polymer of Example I was also evaluated with respect to coagulation activity in forming a sewage sludge from a suspension with aid of filtration. An actual vacuum sewage sludge filtration process was simulated in this test including reproducing steps of pick-up, vacuum drying and discharge. Without benefit of any treatment, the yield of sludge in pounds of dry sludge per square foot filter area per hour was 0.3. With benefit of 1.20 pounds of active polyethylene polyamine per ton of dry solids, the yield of sludge was increased to 2.15 pounds of dry sludge per square foot of filter area per hour. With benefit of 3.6 pounds of polyethylene polyamine per ton of solids, the yield was increased to 2.9. Again, it can be seen that the polyethylene polyamines of the invention are exceptionally versatile as coagulants of systems containing a wide variety of suspended solids.

In order to test the nontoxicity to fish and coagulation activity of the polyethylene polyamine products of this invention, the following runs were made with the stated results.

TABLE IV

Latex coagulation activity and toxicity of synthesized D-2237 polyamines

| Run No. | Reaction conditions (temp. 100° C.) | | | Amount of stripping (percent) | Test results (p.p.m. activity) | |
|---|---|---|---|---|---|---|
| | $NH_3$ in heel (percent) | $NH_3$/EDC mole ratio (reacting) | EDC addition rate | | Latex coagulation | Toxicity |
| 1 | 24–24 | 2.75 | Normal[1] | 42.8 | 415 | 364 |
| 2 | 24–25 | 2.93 | do | 41.8 | 420 | 340 |
| 3 | 24–25 | 2.81 | do | 40.5 | 392 | 400 |
| 4 | 24–25 | 3.07 | do | 43.4 | 436 | 351 |
| 5 | 24–25 | 2.94 | do | 42.3 | 434 | 431 |
| 6 | 21 | 2.80 | do | 41.0 | 421 | 329 |
| 7 | 30 | 3.08 | do | 35.8 | 525 | 523 |
| 8 | 24–25 | 4.00 | do | 41.1 | 595 | 280 |
| 9 | 24–25 | 3.18 | Fast[2] | 43.4 | 489 | 553 |
| 10 | 21 | 3.11 | Normal | 24.9 | 541 | |

[1] About 0.6 gm./hr./gm. $NH_3$.
[2] 0.87 gm./hr./gm. $NH_3$.

In this case respective coagulant activities were tested on SBR latex. The higher molecular weight products formed by the semi-batch process had 50–100% greater efficiency as coagulants than did the prior art polyethylene polyamine materials, even though molar ratios of ammonia and ethylene dichloride employed and other process variables were the same in each case. When the total amounts of reactants were added at one time rather As can readily be seen, the activity level is high and the lethal does level is much higher for the polyamines of this invention than those of other processes.

Obviously, many modifications and variations of the invention as hereinbefore set forth may be made without departing from the spirit and scope thereof, and therefore only such limitations should be imposed as are indicated in the appended claims.

We claim:

1. A polyethylene polyamine polymer composition of matter which is substantially nontoxic to fish, which is formed by the steps of reacting, in presence of sufficient water to solubilize the formed product, ethylene dichloride with ammonia, said reaction being carried out at a temperature ranging from 135° to 400° F. and under a pressure of 75 to 1000 p.s.i. by slowly introducing ethylene dichloride into a reaction zone containing a fixed amount of ammonia at a rate sufficient to maintain a fixed predetermined temperature within said limits, and wherein the molar ratio of ammonia to ethylene dichloride is in excess of 2.6:1, said composition having a molecular weight in excess of 100, being water insoluble at a pH greater than 9 and having a carbon to nitrogen atom ratio of at least 2.5:1.

2. The polyethylene polyamine polymer composition of matter of claim 1 where the carbon to nitrogen atom ratio is within the range of 2.8:1 to 3.0:1.

References Cited
UNITED STATES PATENTS

| | | | |
|---|---|---|---|
| 3,484,488 | 12/1969 | Lichtenwalter et al. | 260—585 A |
| 2,769,841 | 11/1956 | Dylewski et al. | 260—585 A |

LEWIS GOTTS, Primary Examiner

R. L. RAYMOND, Assistant Examiner

U.S. Cl. X.R.

260—46.5 G, 585 A